(12) United States Patent
Yang

(10) Patent No.: US 12,414,045 B2
(45) Date of Patent: Sep. 9, 2025

(54) METHOD AND DEVICE FOR WAKEUP TIME CONTROL

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 483 days.

(21) Appl. No.: 17/916,790

(22) PCT Filed: Apr. 7, 2020

(86) PCT No.: PCT/CN2020/083592
§ 371 (c)(1),
(2) Date: Oct. 3, 2022

(87) PCT Pub. No.: WO2021/203248
PCT Pub. Date: Oct. 14, 2021

(65) Prior Publication Data
US 2023/0164696 A1    May 25, 2023

(51) Int. Cl.
*H04W 52/02* (2009.01)
*H04W 76/23* (2018.01)
*H04W 76/28* (2018.01)

(52) U.S. Cl.
CPC ....... *H04W 52/0248* (2013.01); *H04W 76/23* (2018.02); *H04W 76/28* (2018.02)

(58) Field of Classification Search
CPC . H04W 52/0248; H04W 76/23; H04W 76/28; H04W 92/18; H04W 52/0229; H04W 52/028; H04W 52/0216; H04W 4/70; H04L 1/1861; H04L 1/1893; H04L 1/1851; H04L 1/1896; Y02D 30/70
See application file for complete search history.

(56) References Cited

U.S. PATENT DOCUMENTS

| | | |
|---|---|---|
| 2018/0020382 A1* | 1/2018 | Kim ............... H04L 1/1819 |
| 2018/0041310 A1* | 2/2018 | Wu ............... H04L 69/324 |
| 2019/0116626 A1 | 4/2019 | Zhao |
| 2021/0068053 A1* | 3/2021 | Nam ............. H04W 52/0229 |
| 2021/0227602 A1* | 7/2021 | Li ............... H04L 5/0091 |
| 2023/0111565 A1* | 4/2023 | Lee ............... H04L 5/0094 370/329 |

(Continued)

FOREIGN PATENT DOCUMENTS

| | | |
|---|---|---|
| CN | 107241678 A | 10/2017 |
| CN | 108307489 A | 7/2018 |

(Continued)

OTHER PUBLICATIONS

International Search Report of PCT/CN2020/083592 dated Jan. 11, 2020, (4p).

(Continued)

*Primary Examiner* — Afshawn M Towfighi
(74) *Attorney, Agent, or Firm* — Arch & Lake LLP

(57) ABSTRACT

A method and device for wakeup time control. A first terminal determines available resources in a resource pool. The available resources are resources for sidelink communication between the first terminal and a second terminal. The first terminal controls the time when the first terminal is in a wakeup state on the basis of the available resources.

18 Claims, 6 Drawing Sheets

(56) References Cited

U.S. PATENT DOCUMENTS

2023/0115633 A1* 4/2023 Park .................. H04W 72/0446
                                                    370/311
2023/0363048 A1* 11/2023 Park .................. H04W 28/0268

FOREIGN PATENT DOCUMENTS

| CN | 110351898 A | 10/2019 |
| WO | 2018064477 A1 | 4/2018 |

OTHER PUBLICATIONS

Intel Corporation, "DRX in Sidelink", 3GPP TSG RAN WG2#97 R2-1701309, Athens, Greece, Feb. 13-17, 2017, (2p).

* cited by examiner

METHOD AND DEVICE FOR WAKEUP TIME CONTROL

CROSS-REFERENCE TO RELATED APPLICATION

This application is the US national phase application of International Application No. PCT/CN2020/083592, filed on Apr. 7, 2020, the entire content of which is incorporated herein by reference for all purposes.

TECHNICAL FIELD

The disclosure relates to a field of communication technologies, in particular to a method for wakeup time control, an apparatus for wakeup time control and a computer-readable storage medium.

BACKGROUND

Discontinuous Reception (DRX) technology causes terminals to stop monitoring the Physical Downlink Control Channel (PDCCH) for a period of time, to save power.

In the DRX mechanism, the terminals in the wakeup state (also known as awake state or active state) continue monitoring the PDCCH until a timer corresponding to the wakeup state expires.

In the related art, the DRX technology is used in communication between the terminals and access network devices, but how to apply this technology to new application scenarios remains to be studied.

SUMMARY

A first aspect of the disclosure provides a method for wakeup time control. The method includes: determining available resources in a resource pool by a first terminal, wherein the available resources are resources for sidelink communication between the first terminal and a second terminal; and controlling a time when the first terminal is in a wakeup state by the first terminal based on the available resources.

A second aspect of the disclosure provides a device for wakeup time control. The device includes: a processor, and a memory configured to store instructions executable by the processor. The processor is configured to load and execute the executable instructions to implement the method for wakeup time control of the first aspect of the disclosure.

A third aspect of the disclosure provides a non-transitory computer readable storage medium. When instructions in the computer storage medium are executed by a processor, the method for wakeup time control of the first aspect of the disclosure is implemented.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

It should be understood that "plurality" mentioned in the disclosure refers to two or more. The term "and/or" describes the association relationship of the associated objects, indicating that there can be three types of relationships, for example, A and/or B, which means that A exists alone, A and B exist at the same time, and B exists alone. The character "/" generally indicates that the associated objects before and after are in an "or" relationship. The terms "first", "second" and similar terms used in the description and claims of the disclosure do not denote any order, quantity or importance, but are only used to distinguish different components.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

In order to facilitate the understanding of the embodiments of the disclosure, some terms in the disclosure are first explained below.

Sidelink communication is a way in which neighboring terminals can transmit data over a sidelink within a close range, without the need to forward data through an access network device (e.g. a base station).

Figure 1:
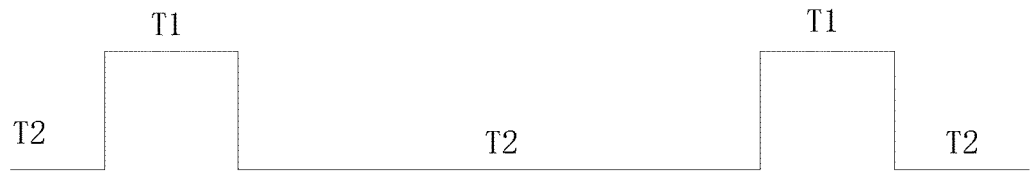
FIG. 1 is a schematic diagram of DRX cycle.

DRX cycle: in a DRX mechanism, DRX cycle consists of the "On Duration" portion T1 and the "Opportunity for DRX" portion T2, as shown in FIG. 1. Within the On Duration, the terminal monitors and receives the PSCCH, while during the Opportunity for DRX, the terminal may not monitor the PSCCH to reduce power consumption.

On Duration Timer indicates the time during a DRX cycle when the terminal monitors PSCCH subframes, and during this time (i.e., the afore-mentioned On Duration portion T1), the terminal is in the wakeup state.

Inactivity Timer indicates how many more PSCCH subframes need to be monitored after the terminal has successfully decoded a PSCCH subframe indicating sidelink transmission.

Reception DRX Retransmission Timer indicates the maximum number of PSCCH subframes that should be continuously monitored before the terminal receives an expected sidelink retransmission signal.

Transmission DRX Retransmission Timer indicates the maximum number of PSCCH subframes that should be continuously monitored before the terminal receives an expected sidelink feedback signal.

Reception HARQ RTT timer indicates the minimum number of PSCCH subframes that the terminal needs to wait before receiving the expected sidelink retransmission signal.

Transmission HARQ RTT timer indicates the minimum number of PSCCH subframes that the terminal needs to wait before receiving the expected sidelink feedback signal.

For DRX active time (also known as wakeup time), the terminal monitors PSCCH subframes in the DRX active time. DRX active time includes a running time of the aforementioned On Duration Timer, a running time of the Inactivity Timer, a running time of the transmission DRX Retransmission Timer, and a running time of the reception DRX Retransmission Timer.

DRX off time refers to time other than the DRX active time. In the DRX off time, the terminal does not monitor the PSCCH subframes.

Figure 2:
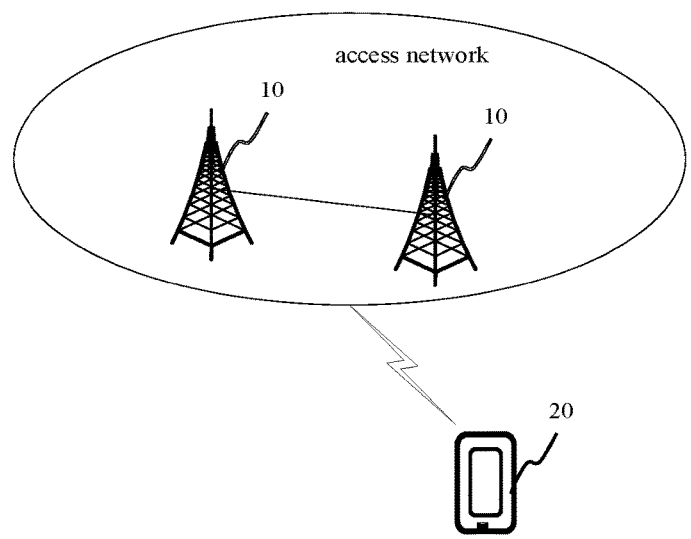
FIG. 2 is a schematic diagram of a communication system according to an embodiment of the present disclosure.

FIG. 2 is a schematic diagram of a communication system according to an embodiment. As illustrated in FIG. 2, the communication system may include access network devices 10 and terminals 20.

The access network devices 10 are deployed in the wireless access network to provide wireless access to the terminals 20. The access network device may be a Base Station (BS). The access network device 10 may communicate wirelessly with the terminal 20 via one or more antennas. The access network device 10 may provide communication coverage for the geographical area where it is located. The BS may include different types of macro BSs, micro BSs, relay stations, and access points. In some embodiments, the BS may be referred to by those skilled in the art as BS transceiver, wireless BS, access point, wireless transceiver, Basic Service Set (BSS), Extended Service Set (ESS), Node B (NodeB), evolved NodeB (eNB or eNodeB) or other appropriate terms. For example, in a 5G system, the BS is referred to as gNB. For ease of description, in embodiments of the disclosure, devices that provide the wireless communication function to the terminals 20 are collectively referred to as the access network devices.

The terminals 20 may be distributed throughout the entire mobile communication system and each of the terminals 20 may be stationary or mobile. The terminal 20 may also be referred to by those skilled in the art as a mobile station, a subscriber station, a mobile unit, a subscriber unit, a wireless unit, a remote unit, a mobile device, a user device, a wireless device, a wireless communication device, a remote device, a mobile subscriber station, an access terminal, a mobile terminal, a wireless terminal, a remote terminal, a handheld device, a user agent, a mobile client, a client, or other appropriate terms. The terminal 20 may be a cellular telephone, a Personal Digital Assistant (PDA), a wireless modem, a wireless communication device, a handheld device, a tablet computer, a laptop computer, a cordless telephone, or a Wireless Local Loop (WLL) station. The terminal 20 is able to communicate with the access network device 10 in the mobile communication system.

The access network device 10 and the terminal 20 can communicate with each other through via radio technology, e.g., a Uu interface. The communication link between the access network device 10 and the terminal 20 may include: down link (DL) transmission from the access network device 10 to the terminal 20, and/or, up link (UP) transmission from the terminal 20 to the access network device 10.

Sidelink communication between terminals can be achieved via radio technology, for example, by a direct communication interface (e.g., a PC5 interface).

The mobile communication system in FIG. 1 may be a Long Term Evolution (LTE) system, or a next-generation evolution system based on the LTE system, such as an LTE-Advanced (LTE-A) system, a 5G system (also known as NR system), or a next-generation evolution system based on the 5G system. In the embodiments of the disclosure, the terms "system" and "network" are often used interchangeably, but their meanings can be understood by those skilled in the art.

The communication systems and service scenarios described in the embodiments of the disclosure are for the purpose of illustrating the technical solution of the embodiments of the disclosure more clearly, and do not constitute a limitation on the technical solution provided by the embodiments of the disclosure. Those of ordinary skill in the art know that with the evolution of communication systems and the emergence of new service scenarios, the technical solution provided by the embodiments of the disclosure are also applicable to similar technical problems.

The access network device 10 may allocate resources required for sidelink communication, which may be referred to as a sidelink communication resource pool, to the terminal 20 within the coverage area. The sidelink communication resource pool may include a sending resource pool and a receiving resource pool.

When the terminal sends a signal carrying Sidelink Control Information (SCI) and/or data, resources are selected from the sending resource pool. A portion of resources may be divided from the sending resource pool for sending a feedback signal. When the terminal needs to send a feedback signal, it selects resources from this portion of resources. Moreover, when a receiving terminal receives signals, it selects resources from the receiving resource pool.

In embodiments of the disclosure, when the first terminal and the second terminal perform sidelink communication, they both obtain resources from the sidelink communication resource pool to transmit signals. That is, the first terminal and the second terminal can determine the resources contained in the sidelink communication resource pool.

In an embodiment, the access network device 10 may configure the sidelink communication resource pool for the terminal 20 via a system message. In this case, a plurality of the terminals 20 share the resources in the sidelink communication resource pool. Alternatively, the access network device 10 may also configure the sidelink communication resource pool for the terminal 20 by a dedicated signaling, and the terminal 20 then informs other terminals 20 of its own dedicated sidelink communication resource pool through a sidelink communication signaling.

In embodiments of the disclosure, the resources in the sending resource pool may include time domain resources and frequency domain resources. The time domain resources may be in units of time slots, and the frequency domain resources may be in units of resource blocks. The units of the time domain resources and the units of the frequency domain resources may be set according to actual needs, which is not limited in the disclosure.

Figure 3:
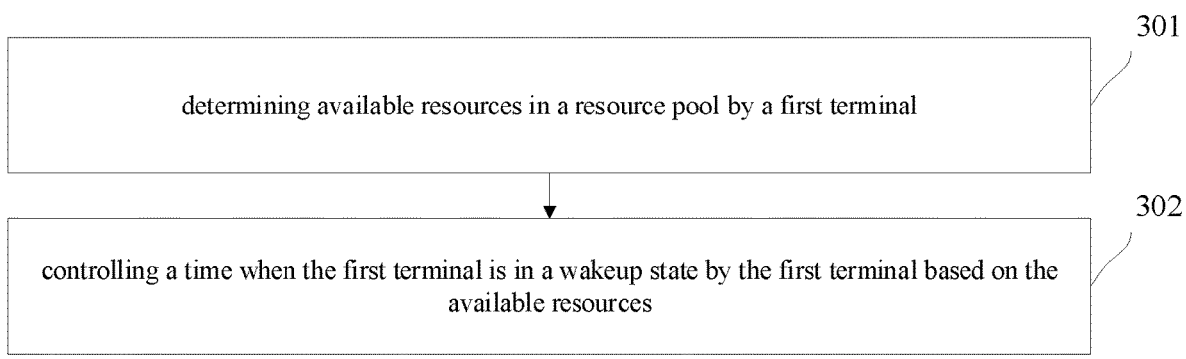
FIG. 3 is a flowchart of a method for wakeup time control according to an embodiment of the present disclosure.

FIG. 3 is a flowchart of a method for wakeup time control according to an embodiment. The method may be performed by the terminal 20 in FIG. 2. As illustrated in FIG. 3, the method includes the following steps.

At step 301, available resources in a resource pool are determined by a first terminal.

The resource pool is a sidelink communication resource pool, and the available resources are resources for sidelink communication between the first terminal and the second terminal.

At step 302, a time when the first terminal is in a wakeup state is controlled by the first terminal based on the available resources.

In embodiments of the disclosure, when the first terminal is in the wakeup state, the first terminal monitors at least one of sidelink physical channels. The sidelink physical channels include the physical sidelink shared channel (PSSCH), the physical sidelink control channel (PSCCH) and the physical sidelink feedback channel (PSFCH). The PSSCH is configured to send data bearers. The PSCCH is configured to send sidelink control information (SCI). The SCI may include indication information indicating whether to send a feedback signal. When the sending terminal sends a signal on the sidelink, it carries an indication in the SCI, indicating whether the receiving terminal needs to send a feedback signal. After receiving the SCI, the receiving terminal decides whether to send a feedback signal according to the indication. The PSFCH is configured to send a feedback signal. When the first terminal is not in the wakeup state (i.e., in the sleep state), the first terminal does not monitor the sidelink physical channel, and thus the power consumption of the terminal is reduced.

In an embodiment, the available resources include: receiving resources for the first terminal to receive signals from the second terminal, and/or, sending resources for the second terminal to send signals to the first terminal.

In an embodiment, controlling the time when the first terminal is in the wakeup state by the first terminal based on the available resources, includes: controlling a running of a timer by the first terminal based on the available resources, in which the first terminal is in the wakeup state while the timer is running. That is, the timer is controlled to run when there are available resources, and the timer is controlled to not run when there is no available resource. The timer is controlled to not run by pausing the timer or not starting the timer. The terminal is only in the wakeup state when there are available resources, which reduces the time when the terminal is in the wakeup state and further reduces the power consumption of the terminal.

In an embodiment, the timer includes at least one of an inactivity timer, a transmission DRX retransmission timer, and a reception DRX retransmission timer.

In an embodiment, controlling the running of the timer by the first terminal based on the available resources includes at least one of the following:

in response to determining that there is no available resource for the second terminal to send a retransmission signal when a reception HARQ RTT timer expires, not starting the reception DRX retransmission timer, and starting the reception DRX retransmission timer until a time domain location where the available resources of the second terminal are located is reached;

in response to determining that there are available resources for the second terminal to send a retransmission signal when the reception HARQ RTT timer expires, starting the reception DRX retransmission timer;

in response to determining that there is no available resource for the second terminal to send a feedback signal when a transmission HARQ RTT timer expires, not starting the transmission DRX retransmission timer, and starting the transmission DRX retransmission timer until a time domain location where the available resources of the second terminal are located is reached;

in response to determining that there are available resources for the second terminal to send a feedback signal when a transmission HARQ RTT timer expires, starting the transmission DRX retransmission timer; and in response to determining that available resources for the second terminal to send signals are discontinuous in a time domain, pausing the timer during an interval of the available resources.

In an embodiment, in response to determining that the available resources for the second terminal to send signals are discontinuous in the time domain, pausing the timer during the interval of the available resources, includes:

in response to determining that the available resources for the second terminal to send a retransmission signal are discontinuous in the time domain, pausing a reception DRX retransmission timer during the interval of the available resources; and/or in response to determining that the available resources for the second terminal to send a feedback signal are discontinuous in the time domain, pausing a transmission DRX retransmission timer during the interval of the available resources; and/or in response to determining that the available resources for the second terminal to send a data signal transmitted for the first time are discontinuous in the time domain, pausing an inactivity timer during the interval of the available resources.

In an embodiment, the method further includes: starting a reception HARQ RTT timer in response to the first terminal sending a feedback signal for instructing the second terminal to retransmit; and/or, starting a transmission HARQ RTT timer in response to the first terminal sending feedback indication information for instructing the second terminal to send a feedback signal.

In an embodiment, the method further includes: controlling a running duration of the timer based on timer configuration parameters.

In an embodiment, the timer configuration parameters include a length and an offset of the timer.

In an embodiment, controlling the running duration of the timer based on the timer configuration parameters includes: obtaining a sum of the length and the offset of the timer as the running duration of the timer.

In an embodiment, the method further includes: receiving the timer configuration parameters.

In an embodiment, receiving the timer configuration parameters, includes: receiving the timer configuration parameters sent by an access network device through a RRC reconfiguration message; or receiving the timer configuration parameters sent by the second terminal through a sidelink RRC reconfiguration message.

In an embodiment, the method further includes: monitoring a PSCCH and a PSSCH when the reception DRX retransmission timer is running, to obtain the retransmission signal sent by the second terminal; and/or monitoring a PSFCH when the transmission DRX retransmission timer is running, to obtain the feedback signal sent by the second terminal.

It should be noted that the foregoing steps 301-302 and the foregoing optional steps may be combined arbitrarily.

Figure 4:
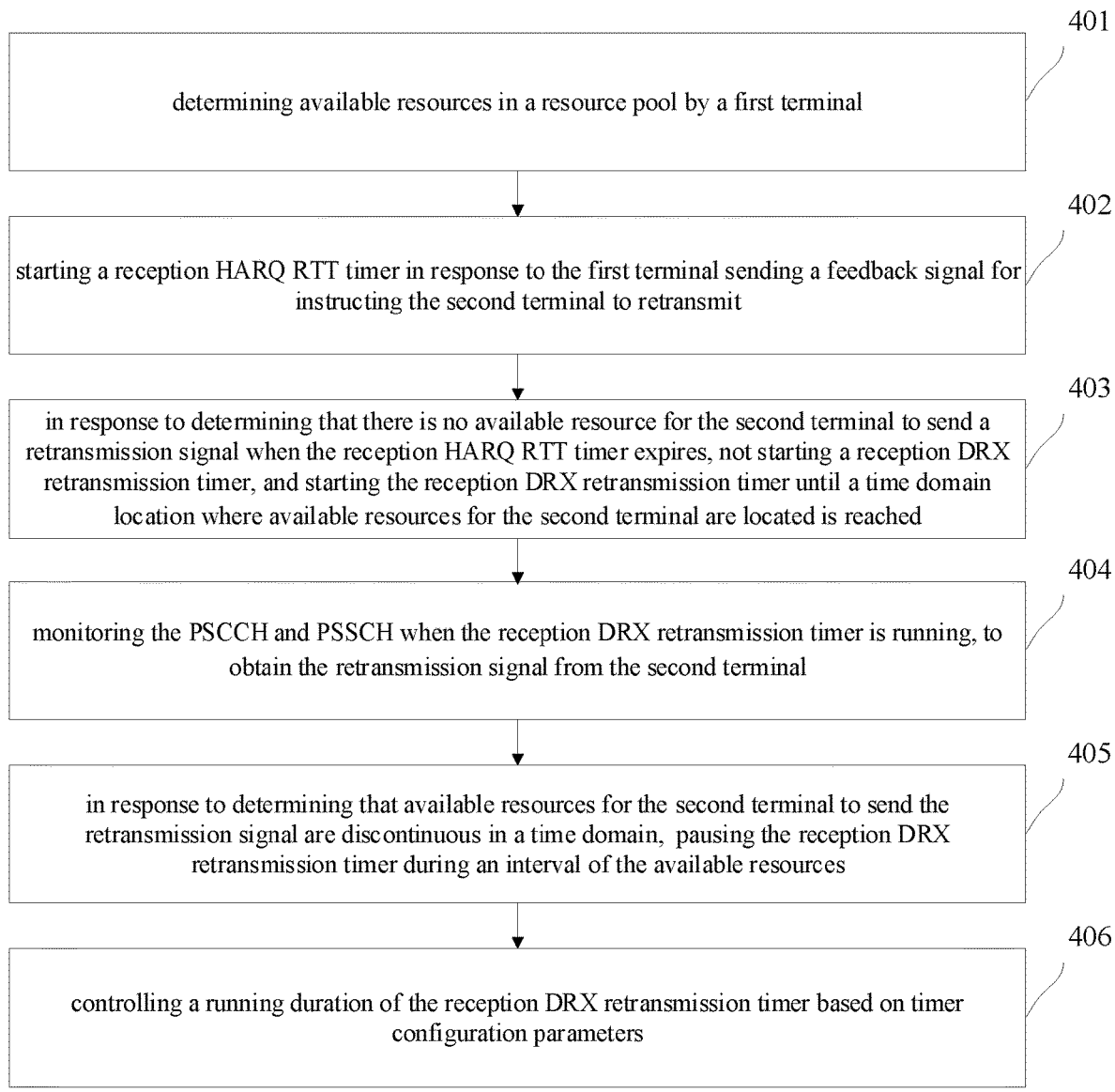
FIG. 4 is a flowchart of a method for wakeup time control according to an embodiment of the present disclosure.

FIG. 4 is a flowchart of a method for wakeup time control according to an embodiment. The method can be performed by a terminal. As illustrated in FIG. 4, the method includes the following steps.

At step 401, available resources in a resource pool are determined by a first terminal.

The resource pool is a sidelink communication resource pool. As described above, the sidelink communication resource pool includes: a sending resource pool and/or a receiving resource pool. The available resources are resources for sidelink communication between the first terminal and the second terminal.

At step 402, the first terminal starts a reception HARQ RTT timer in response to sending a feedback signal for instructing a second terminal to retransmit.

Accordingly, upon receiving the feedback signal, the second terminal needs to select resources from the sending resource pool to send a retransmission signal.

For example, if the first terminal does not receive the data sent by the second terminal correctly, the first terminal sends a feedback signal to the second terminal for instructing the second terminal to retransmit.

For example, a length of the reception HARQ RTT timer may be N time domain symbols, N being a positive integer.

At step 403, in response to determining that there is no available resource for the second terminal to send a retransmission signal when a reception HARQ RTT timer expires, the first terminal does not start a reception DRX retransmission timer, and starts a reception DRX retransmission timer until a time domain location where the available resources of the second terminal are located is reached.

For example, if there is no resource available for sending retransmission data allocated to the current time slot in the sidelink sending resource pool, or if the resources in the sidelink receiving resource pool do not contain resources for the current time slot, it indicates that there are no available resources for the second terminal to send a retransmission signal. It is to be noted that, in this embodiment, the existence of available resources is determined in units of time slots, and in other embodiments, the existence of available resources may also be determined in units of other time lengths.

In a possible implementation, step 403 may be replaced as: in response to determining that there are available resources for the second terminal to send a retransmission signal when a reception HARQ RTT timer expires, the first terminal starts a reception DRX retransmission timer.

In another possible embodiment, step 403 may be replaced as: in response to determining that a reception HARQ RTT timer expires, the first terminal starts a reception DRX retransmission timer. That is, regardless of whether there are available resources, as long as the reception HARQ RTT timer expires, the reception DRX retransmission timer is started.

At step 404, when the reception DRX retransmission timer is running, the first terminal monitors the PSCCH and PSSCH, to obtain the retransmission signal from the second terminal.

At step 405, in response to determining that available resources for the second terminal to send a retransmission signal are discontinuous in a time domain, the first terminal pauses the reception DRX retransmission timer during an interval of the available resources.

Pausing the reception DRX retransmission timer means that the reception DRX retransmission timer is not running, at this time, the first terminal does not monitor the PSCCH and PSSCH, and is in a sleep state.

At step 406, the first terminal controls a running duration of the reception DRX retransmission timer based on timer configuration parameters.

The timer configuration parameters are pre-received and stored locally, and when needed, the corresponding timer configuration parameters can be read locally.

In an embodiment, the method further includes: the first terminal receiving the timer configuration parameters sent by an access network device through a RRC reconfiguration message; or the first terminal receiving the timer configuration parameters sent by the second terminal through a sidelink RRC reconfiguration message.

In a possible implementation, the timer configuration parameters include a length and offset of the timer. Correspondingly, at step 406, the first terminal determines a sum of the length and the offset of the timer as the running duration of the timer. The offset may be set according to the actual situation, for example, it may be set according to the degree of network congestion. The greater the degree of network congestion, the larger the offset. Conversely, the smaller the degree of network congestion, the smaller the offset. When the network is congested, there will be a delay in signal transmission. By setting this offset, the success rate of receiving a retransmission signal can be improved.

In another possible implementation, the timer configuration parameters may include the length of the timer but not the offset. At step 406, the first terminal directly determines the length of the timer as the running duration of the timer.

Embodiments of the disclosure will be described below with reference to specific examples.

1. The sidelink sending resource pool includes time slots 1, 2, 3, 8, 9, and 10.

2. The second terminal sends the sidelink RRC reconfiguration message to the first terminal, the sidelink RRC reconfiguration message carries the timer configuration parameters, and the parameters include 2 time slots for the reception HARQ RTT timer and 2 time slots for the reception DRX retransmission timer, and the offset of the reception DRX retransmission timer is 1 time slot.

3. The first terminal receives a sidelink Media Access Control (MAC) Protocol Data Unit (PDU) sent during the HARQ process corresponding to the second terminal in time slot 1, but receives incorrectly, sends a feedback signal at time slot 2 and starts the reception HARQ RTT timer.

4. In time slot 5, when a HARQ RTT timer expires, since there is no time slot 5 in the sending resource pool, the first terminal determines that the second terminal cannot send retransmission data, and does not start the reception DRX retransmission timer.

5. When reaching time slot 8, the first terminal determines that the second terminal can send the retransmission data, and starts the reception DRX retransmission timer. The length of the reception DRX retransmission timer is 2+1=3 time slots.

6. During the running of the reception DRX retransmission timer, the first terminal monitors the PSCCH and PSSCH.

Figure 5:
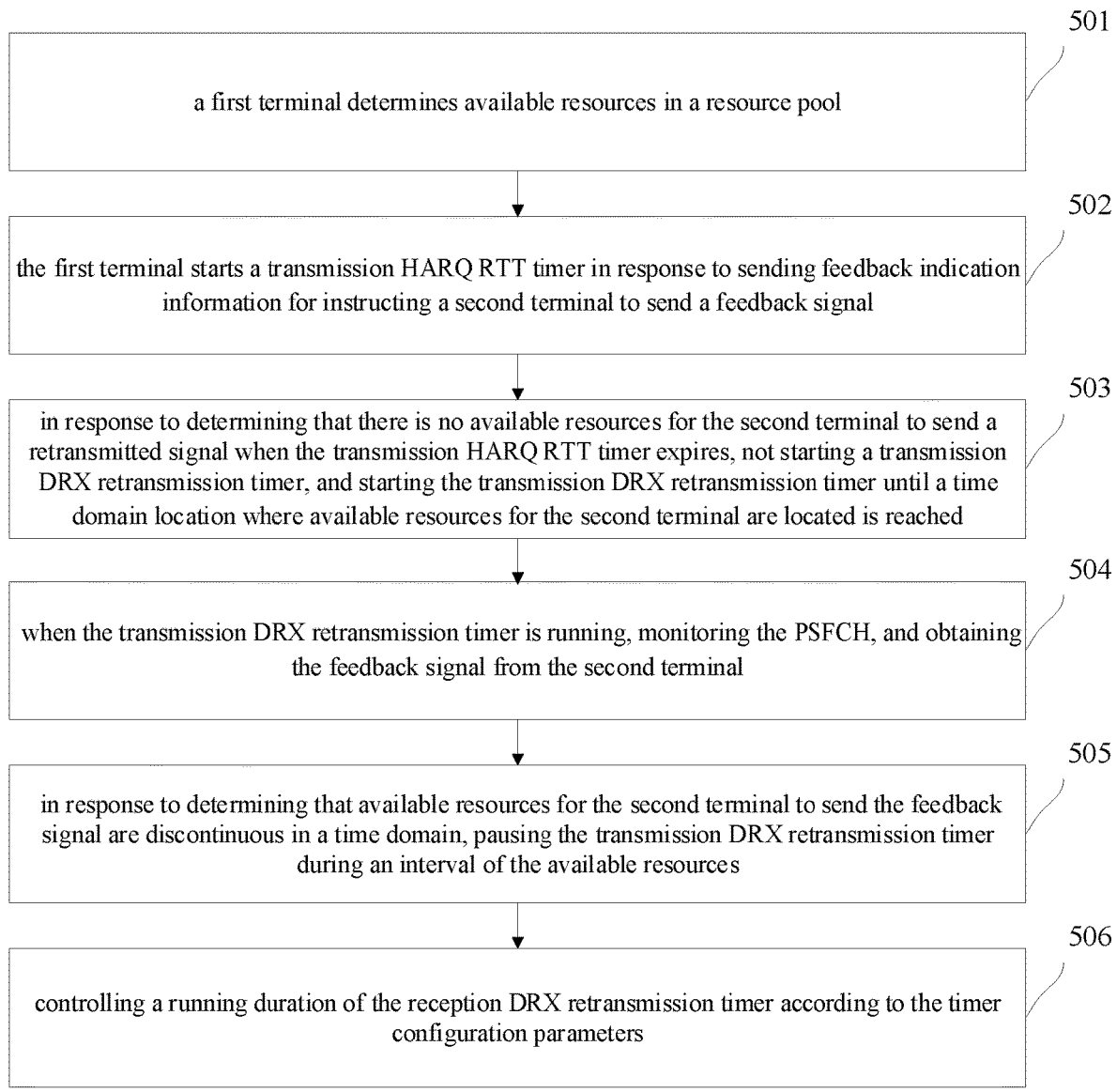
FIG. 5 is a flowchart of a method for wakeup time control according to an embodiment of the present disclosure.

FIG. 5 is a flowchart of a method for wakeup time control according to an embodiment. The method can be performed by a terminal. As illustrated in FIG. 5, the method includes the following steps.

At step 501, a first terminal determines available resources in a resource pool.

Here, the resource pool is a sidelink communication resource pool. As described above, the sidelink communication resource pool includes: a sending resource pool and/or a receiving resource pool. The available resources are resources for sidelink communication between the first terminal and the second terminal.

At step 502, the first terminal starts a reception HARQ RTT timer in response to sending feedback indication information for instructing a second terminal to send a feedback signal.

Correspondingly, after receiving the feedback indication information, the second terminal needs to select resources from the sending resource pool to send a feedback signal.

For example, the length of the reception HARQ RTT timer may be N time-domain symbols, and N is a positive integer.

At step 503, in response to determining that there is no available resource for the second terminal to send a retransmission signal when a transmission HARQ RTT timer expires, the first terminal does not start a transmission DRX retransmission timer, and starts the transmission DRX retransmission timer until a time domain location where the available resources of the second terminal are located is reached.

For example, when the transmission HARQ RTT timer expires, if no sending resources for sending a feedback signal in the sidelink communication resource pool is allocated to the current time slot, it means that the second terminal cannot send a feedback signal in the current time slot, that is, there is no available resource for the second terminal to send a feedback signal.

In a possible implementation, step 503 may be replaced as: in response to determining that there are available resources for the second terminal to send a feedback signal when the transmission HARQ RTT timer expires, the first terminal starts the transmission DRX retransmission timer.

In another possible implementation, step 503 may be replaced as: in response to determining that the transmission HARQ RTT timer expires, the first terminal starts the transmission DRX retransmission timer. That is, regardless of whether there are available resources, as long as the transmission HARQ RTT timer expires, the transmission DRX retransmission timer is started.

At step 504, when the transmission DRX retransmission timer is running, the first terminal monitors the PSFCH to obtain the feedback signal sent by the second terminal.

At step 505, in response to determining that available resources for the second terminal to send a feedback signal are discontinuous in a time domain, the first terminal pauses the transmission DRX retransmission timer during an interval of the available resources.

Pausing the transmission DRX retransmission timer means that the transmission DRX retransmission timer is not running, and at this time, the first terminal does not monitor the PSFCH and is in a sleep state.

At step 506, the first terminal controls a running duration of the reception DRX retransmission timer according to the timer configuration parameters.

The timer configuration parameters may be pre-received and stored locally, and when needed, the corresponding timer configuration parameters may be read locally.

In an embodiment, the method further includes: the first terminal receiving the timer configuration parameters sent by an access network device through a RRC reconfiguration message; or, the first terminal receiving the timer configuration parameters sent by the second terminal through a sidelink RRC reconfiguration message.

In a possible implementation, the timer configuration parameters include a length and offset of the timer. Correspondingly, at step 506, the first terminal determines a sum of the length and the offset as the running duration of the timer. The offset may be set according to the actual situation, for example, may be set according to the degree of network congestion. The greater the degree of network congestion, the larger the offset. Conversely, the smaller the degree of network congestion, the smaller the offset. When the network is congested, there will be a delay in signal transmission. By setting this offset, the success rate of receiving a retransmission signal can be improved.

In another possible implementation, the timer configuration parameters may include the length of the timer but not the offset. At step 506, the first terminal directly determines the length of the timer as the running duration of the timer.

Embodiments of the disclosure will be described below with reference to specific examples.

1. The available resources for PSFCH transmission are located in time slots 1, 2, 3, 8 and 10.

2. The second terminal sends the sidelink RRC reconfiguration message to the first terminal, the message carries the timer configuration parameters, and the parameters include 2 time slots for the transmission HARQ RTT timer and 1 time slot for the transmission DRX retransmission timer, and the offset of the transmission DRX retransmission timer is 1 time slot.

3. The first terminal sends the SCI indicating that feedback is required to the second terminal in time slot 1, and starts the reception HARQ RTT timer.

4. In time slot 4, when a HARQ RTT timer expires, since there is no PSFCH resource in time slot 5, the first terminal determines that the second terminal cannot send the feedback signal, and does not start the transmission DRX retransmission timer.

5. When reaching time slot 8, the first terminal determines that the second terminal can send the feedback signal, and then starts a transmission DRX retransmission timer. The length of the reception DRX retransmission timer is 1+1=2 time slots.

6. When reaching the time slot 9, the running of the transmission DRX retransmission timer is paused, and when reaching the time slot 10, the running of the transmission DRX retransmission timer is continued.

7. During the running of the transmission DRX retransmission timer, the first terminal monitors the PSFCH.

Figure 6:
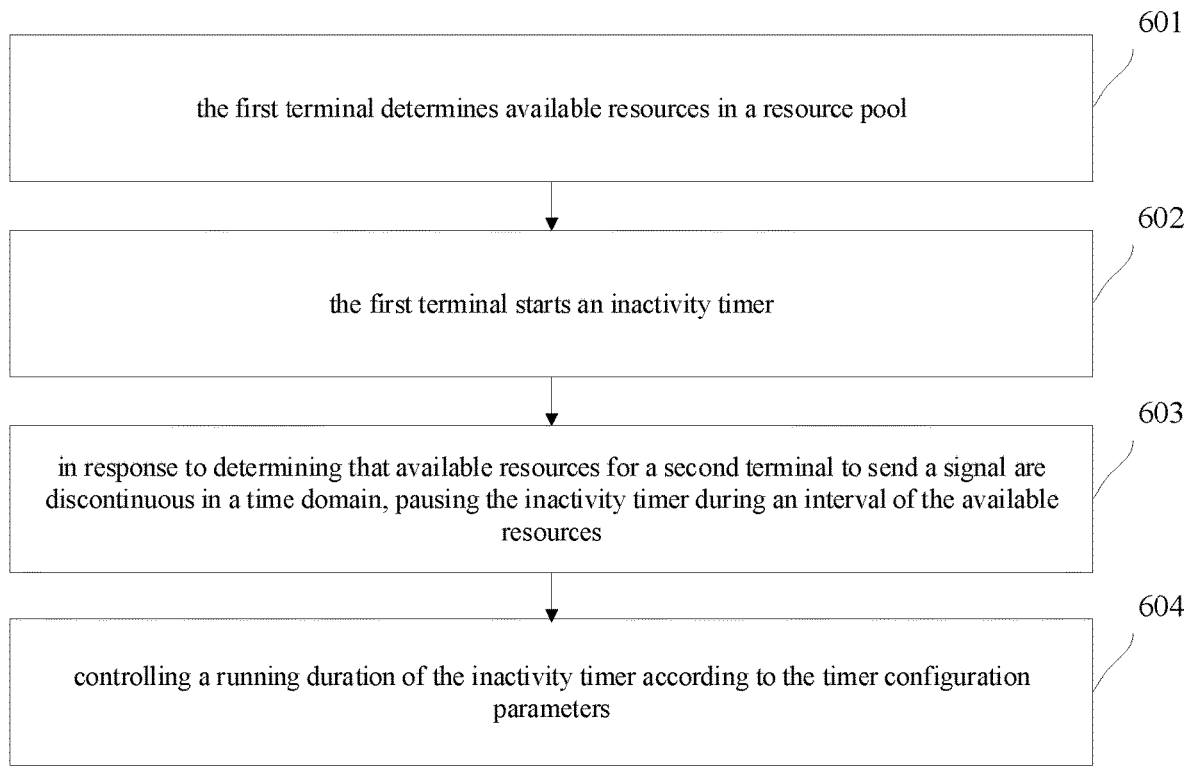
FIG. 6 is a flowchart of a method for wakeup time control according to an embodiment of the present disclosure.

FIG. 6 is a flowchart of a method for wakeup time control according to an embodiment. The method can be performed by a terminal. As illustrated in FIG. 6, the method includes the following steps.

At step 601, a first terminal determines available resources in a resource pool.

For related contents, reference can be made to steps 401 and 501.

At step 602, the first terminal starts an inactivity timer.

For example, when the first terminal successfully decodes a PSCCH subframe indicating sidelink transmission, the first terminal starts the inactivity timer.

At step 603, in response to determining that available resources for a second terminal to send a signal are discontinuous in a time domain, the first terminal pauses the timer during an interval of the available resources.

Pausing the inactivity timer means that the inactivity timer is not running, and at this time, the first terminal does not monitor the PSCCH and the PSSCH, and is in a sleep state.

At step 603, the signal is a data signal sent by the second terminal for the first time.

At step 604, the first terminal controls a running duration of the inactivity timer according to the timer configuration parameters.

For related content, reference may be made to the foregoing steps 406 and 506, and detailed descriptions are omitted here.

In embodiments of the disclosure, when the second terminal temporarily has no available resources for sending the signal, that is, during the interval of the available resources, the inactivity timer is paused, so that the first terminal is in the sleep state. That is, when it is difficult for the first terminal to receive the signal sent by the second terminal, the first terminal is in a sleep state, thereby effectively reducing the power consumption of the first terminal.

Figure 7:
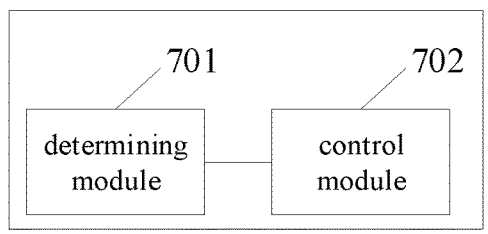
FIG. 7 is a schematic diagram of an apparatus for wakeup time control according to an embodiment of the present disclosure.

FIG. 7 is a schematic diagram of an apparatus for wakeup time control according to an embodiment. The apparatus is capable of implementing the function of the terminal in the above method embodiments, this function can be implemented in hardware or by corresponding software executable by hardware. As illustrated in FIG. 7, the apparatus 700 includes: a determining module 701 and a control module 702.

The determining module 701 is configured to determine available resources in a resource pool. The available resources are resources for sidelink communication between a first terminal and a second terminal. The control module 702 is configured to control a time when the first terminal is in a wakeup state based on the available resources.

In an embodiment, the available resources include: receiving resources for the first terminal to receive signals from the second terminal, and/or, sending resources for the second terminal to send signals to the first terminal.

In an embodiment, the control module 702 is further configured to: control a running of the timer based on the available resources. The first terminal is in the wakeup state while the timer is running, and the timer includes at least one of an inactivity timer, a transmission DRX retransmission timer, and a reception DRX retransmission timer.

In an embodiment, the control module 702 is further configured to: in response to determining that there is no available resource for the second terminal to send a retransmission signal when a reception HARQ RTT timer expires, not start a reception DRX retransmission timer, and start the reception DRX retransmission timer until a time domain location where available resources for the second terminal are located is reached;

in response to determining that there are available resources for the second terminal to send a retransmission signal when a reception HARQ RTT timer is expires, start a reception DRX retransmission timer;

in response to determining that there is no available resource for the second terminal to send a feedback signal when a transmission HARQ RTT timer expires, not start a transmission DRX retransmission timer, and start the transmission DRX retransmission timer until a time domain location where available resources for the second terminal are located is reached;

in response to determining that there are available resources for the second terminal to send a feedback signal when a transmission HARQ RTT timer expires, start a transmission DRX retransmission timer; and in response to determining that available resources for the second terminal to send a signal are discontinuous in a time domain, pause the timer during an interval of the available resources.

In an embodiment, the control module 702 is further configured to: start a reception HARQ RTT timer in response to the first terminal sending a feedback signal for instructing the second terminal to retransmit; and/or, start a transmission HARQ RTT timer in response to the first terminal sending feedback indication information for instructing the second terminal to send a feedback signal.

In an embodiment, the control module 702 is further configured to: control a running duration of the timer based on timer configuration parameters.

In an embodiment, the timer configuration parameters include a length and an offset of the timer, and the control module is further configured to: obtain a sum of the length and the offset as the operation duration of the timer.

In an embodiment, the apparatus further includes: a receiving module 703, configured to receive the timer configuration parameters.

In an embodiment, the receiving module 703 is further configured to: receive the timer configuration parameters sent by an access network device through a RRC reconfiguration message; or receive the timer configuration parameters sent by the second terminal through a sidelink RRC reconfiguration message.

In an embodiment, the apparatus further includes: a monitoring module 704, configured to monitor a PSCCH and a PSSCH when a reception DRX retransmission timer is running, to obtain the retransmission signal from the second terminal; and/or monitor a PSFCH when a transmission DRX retransmission timer is running, to obtain the feedback signal from the second terminal.

Figure 8:
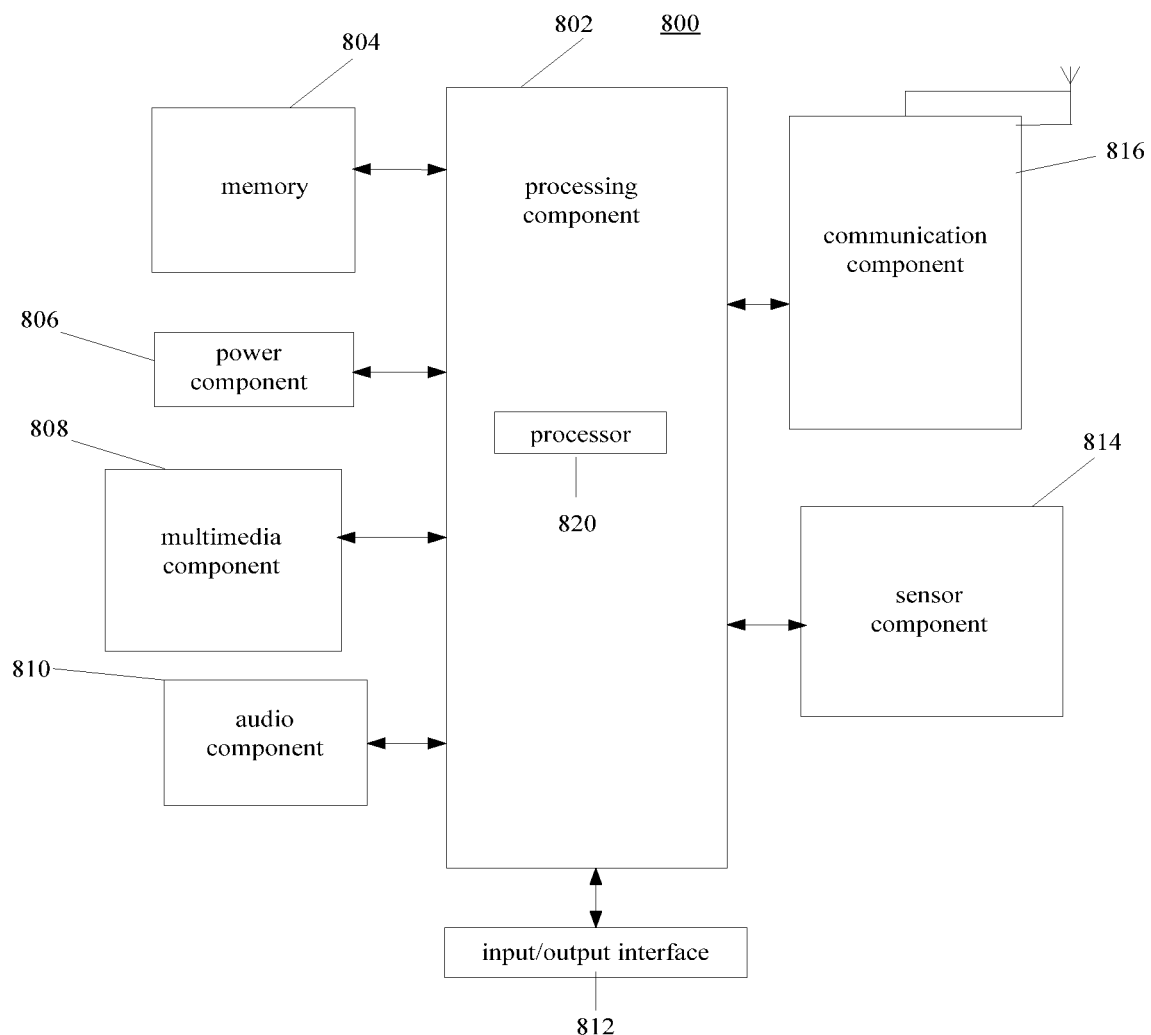
FIG. 8 is a schematic diagram of an apparatus for wakeup time control according to an embodiment of the present disclosure.

FIG. 8 is a block diagram of a device 800 for wakeup time control according to an embodiment. The device 800 may be the above-mentioned terminal. As illustrated in FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to perform all or part of the steps in the above described method. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a programmable read-only memory (PROM), a Read-Only Memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the device 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as 2G, 3G, 4G or 5G or a combination thereof. In an embodiment, the communication component 816 receives a broadcast signal or broadcast associated information from an external broadcast management system via a broadcast channel. In an embodiment, the communication component 816 further includes a near field communication (NFC) module.

In embodiments, the device 800 may be implemented with at least one application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as included in the memory 804, executable by the processor 820 in the device 800, for performing the above method. For example, the non-transitory computer-readable storage medium may be a ROM, a RAM, a CD-ROM, a magnetic tape, a floppy disc, an optical data storage device, and the like.

Figure 9:
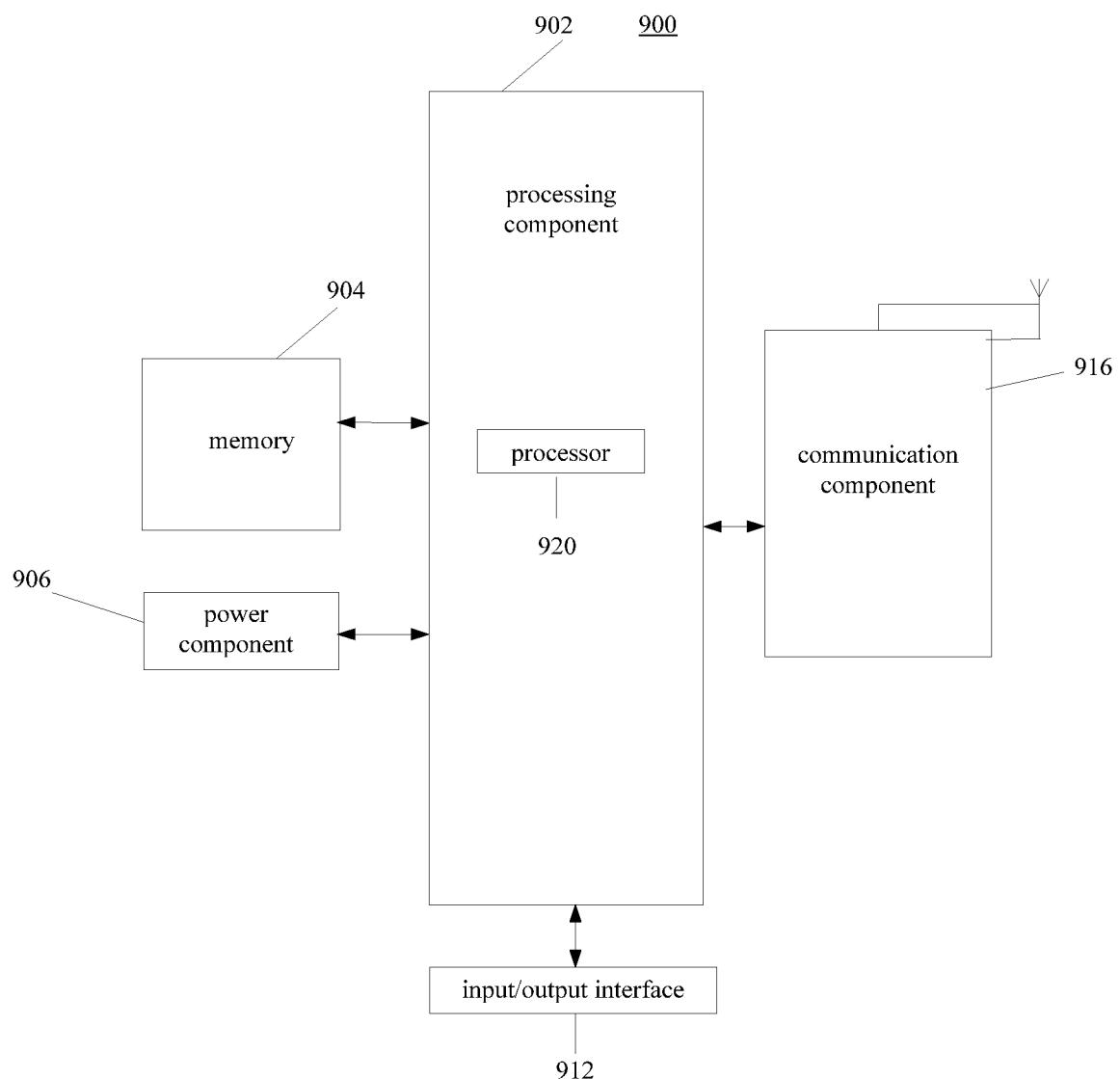
FIG. 9 is a block diagram of an access network device according to an embodiment of the present disclosure.

FIG. 9 is a block diagram of an access network device 900 according to an embodiment. As illustrated in FIG. 9, the device 900 may include one or more of the following components: a processing component 902, a memory 904, a power component 906, an input/output (I/O) interface 912, and a communication component 916.

The processing component 902 typically controls overall operations of the device 900. The processing component 902 may include one or more processors 920 to perform all or part of the steps in the above described method. Moreover, the processing component 902 may include one or more modules which facilitate the interaction between the processing component 902 and other components.

The memory 904 is configured to store various types of data to support the operation of the device 900. Examples of such data include instructions for any applications or methods operated on the device 900. The memory 904 may be implemented using any type of volatile or non-volatile memory devices, or a combination thereof, such as a SRAM, an EEPROM, an EPROM, a PROM, a ROM, a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The communication component 916 is configured to facilitate wireless communication between the access network device and other devices. In the embodiment of the disclosure, the communication component 916 may provide a wireless network based on a communication standard, such as 2G, 3G, 4G or 5G, or a combination thereof, so as to connect with the terminal device.

In embodiments, the device 900 may be implemented with one or more ASICs, DSPs, DSPDs, PLDs, FPGAs, controllers, micro-controllers, microprocessors or other electronic components, for performing the above described method.

An embodiment of the disclosure also provides a communication system. The communication system includes an access network device and a terminal. The terminal is the device for wakeup time control provided by the embodiment shown in FIG. 8. The access network device, as shown in FIG. 9, is configured to configure sidelink communication resources and/or timer configuration parameters for the terminal.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. The method steps of the disclosure listed in the description and drawings of the disclosure are for illustrative purposes only, and should not be construed as limiting the claimed protection scope of the disclosure. The order and combination of these method steps are only exemplary, and those skilled in the art can change or adjust the shown order and combination to achieve corresponding technical effects without departing from the spirit of the disclosure. The technical solutions of adjusting order and/or changing combination mode do not go beyond the scope disclosed in the disclosure. The protection scope claimed by the disclosure is limited only by the appended claims.

What is claimed is:

1. A method for wakeup time control, comprising:
    determining, by a first terminal, available resources in a resource pool, wherein the available resources comprise resources for sidelink communication between the first terminal and a second terminal; and
    controlling, by the first terminal, a time when the first terminal is in a wakeup state based on the available resources;
    wherein controlling, by the first terminal, the time when the first terminal is in the wakeup state based on the available resources comprises:
    controlling, by the first terminal, a running of a timer based on the available resources, wherein the first terminal is in the wakeup state while the timer is running, and the timer comprises at least one of an inactivity timer, a transmission Discontinuous Reception (DRX) retransmission timer, or a reception DRX retransmission timer;
    wherein controlling, by the first terminal, the running of the timer based on the available resources comprises at least one of:
    not starting a reception DRX retransmission timer, and starting the reception DRX retransmission timer until a time domain location where available resources for the second terminal are located is reached, in response to determining that there is no available resource for the second terminal to send a retransmission signal when a reception Hybrid Automatic Repeat reQuest Round-Trip Time (HARQ RTT) timer expires; or
    not starting a transmission DRX retransmission timer, and starting the transmission DRX retransmission timer until a time domain location where available resources for the second terminal are located is reached, in response to determining that there is no available resource for the second terminal to send a feedback signal when a transmission HARQ RTT timer expires.

2. The method of claim 1, wherein the available resources comprise at least one of receiving resources for the first terminal to receive signals from the second terminal, or sending resources for the second terminal to send signals to the first terminal.

3. The method of claim 1, wherein controlling, by the first terminal, the running of the timer based on the available resources comprises at least one of:
    starting a reception DRX retransmission timer, in response to determining that there are available resources for the second terminal to send a retransmission signal when a reception HARQ RTT timer is expires;
    starting a transmission DRX retransmission timer in response to determining that there are available resources for the second terminal to send a feedback signal when a transmission HARQ RTT timer expires; or
    pausing the timer during an interval of the available resources in response to determining that available resources for the second terminal to send a signal are discontinuous in a time domain.

4. The method of claim 3, further comprising at least one of:
    starting, by the first terminal, the reception HARQ RTT timer in response to the first terminal sending a feedback signal for instructing the second terminal to retransmit; or
    starting the transmission HARQ RTT timer in response to the first terminal sending feedback indication information for instructing the second terminal to send a feedback signal.

5. The method of claim 1, further comprising:
    controlling, by the first terminal, a running duration of the timer based on timer configuration parameters.

6. The method of claim 5, wherein the timer configuration parameters comprise a length and an offset of the timer, and wherein the method further comprises:
    controlling, by the first terminal, the running duration of the timer based on the timer configuration parameters, comprises:
    obtaining, by the first terminal, a sum of the length and the offset of the timer as the running duration of the timer.

7. The method of claim 1, further comprising:
    receiving, by the first terminal, timer configuration parameters.

8. The method of claim 7, wherein receiving, by the first terminal, the timer configuration parameters, comprises:
    receiving, by the first terminal, the timer configuration parameters sent by an access network device through a Radio Resource Control (RRC) reconfiguration message; or
    receiving, by the first terminal, the timer configuration parameters sent by the second terminal through a sidelink RRC reconfiguration message.

9. The method of claim 1, further comprising at least one of:
monitoring, by the first terminal, a Physical Sidelink Control Channel (PSCCH) and a Physical Sidelink Shared Channel (PSSCH) when a reception DRX retransmission timer is running, to obtain a retransmission signal from the second terminal; or
monitoring, by the first terminal, a Physical Sidelink Feedback Channel (PSFCH) when a transmission DRX retransmission timer is running, to obtain a feedback signal from the second terminal.

10. A first terminal, comprising:
a processor;
a memory configured to store instructions executable by the processor;
wherein, the processor is configured to load and execute the executable instructions, and the processor is configured to:
determine available resources in a resource pool, wherein the available resources comprise resources for sidelink communication between the first terminal and a second terminal; and
control a time when the first terminal is in a wakeup state based on the available resources;
control a running of a timer based on the available resources, wherein the first terminal is in the wakeup state while the timer is running, and the timer comprises at least one of an inactivity timer, a transmission Discontinuous Reception (DRX) retransmission timer, or a reception DRX retransmission timer;
the processor is configured to perform at least one of:
not starting a reception DRX retransmission timer, and starting the reception DRX retransmission timer until a time domain location where available resources for the second terminal are located is reached, in response to determining that there is no available resource for the second terminal to send a retransmission signal when a reception Hybrid Automatic Repeat reQuest Round-Trip Time (HARQ RTT) timer expires; or
not starting a transmission DRX retransmission timer, and starting the transmission DRX retransmission timer until a time domain location where available resources for the second terminal are located is reached, in response to determining that there is no available resource for the second terminal to send a feedback signal when a transmission HARQ RTT timer expires.

11. A non-transitory computer readable storage medium, wherein when instructions in the computer storage medium are executed by a processor, a method for wakeup time control is implemented, the method comprising:
determining by a first terminal, available resources in a resource pool, wherein the available resources comprise resources for sidelink communication between the first terminal and a second terminal; and
controlling by the first terminal, a time when the first terminal is in a wakeup state based on the available resources;
wherein controlling, by the first terminal, the time when the first terminal is in the wakeup state based on the available resources comprises:
controlling, by the first terminal, a running of a timer based on the available resources, wherein the first terminal is in the wakeup state while the timer is running, and the timer comprises at least one of an inactivity timer, a transmission Discontinuous Reception (DRX) retransmission timer, or a reception DRX retransmission timer;
wherein controlling, by the first terminal, the running of the timer based on the available resources comprises at least one of:
not starting a reception DRX retransmission timer, and starting the reception DRX retransmission timer until a time domain location where available resources for the second terminal are located is reached, in response to determining that there is no available resource for the second terminal to send a retransmission signal when a reception Hybrid Automatic Repeat reQuest Round-Trip Time (HARQ RTT) timer expires; or
not starting a transmission DRX retransmission timer, and starting the transmission DRX retransmission timer until a time domain location where available resources for the second terminal are located is reached, in response to determining that there is no available resource for the second terminal to send a feedback signal when a transmission HARQ RTT timer expires.

12. The first terminal of claim 10, wherein the available resources comprise at least one of receiving resources for the first terminal to receive signals from the second terminal, or sending resources for the second terminal to send signals to the first terminal.

13. The first terminal of claim 10, wherein the processor is configured to perform at least one of:
starting a reception DRX retransmission timer in response to determining that there are available resources for the second terminal to send a retransmission signal when a reception HARQ RTT timer is expires;
starting a transmission DRX retransmission timer in response to determining that there are available resources for the second terminal to send a feedback signal when a transmission HARQ RTT timer expires; or
pausing the timer during an interval of the available resources in response to determining that available resources for the second terminal to send a signal are discontinuous in a time domain.

14. The first terminal of claim 13, wherein the processor is configured to perform at least one of:
starting the reception HARQ RTT timer in response to the first terminal sending a feedback signal for instructing the second terminal to retransmit; or
starting the transmission HARQ RTT timer in response to the first terminal sending feedback indication information for instructing the second terminal to send a feedback signal.

15. The first terminal of claim 10, wherein the processor is further configured to:
control a running duration of the timer based on timer configuration parameters.

16. The first terminal of claim 15, wherein the timer configuration parameters comprise a length and an offset of the timer, and
the processor is configured to:
obtain a sum of the length and the offset of the timer as the running duration of the timer.

17. The first terminal of claim 10, wherein the processor is further configured to:
receive timer configuration parameters;
especially, the processor is configured to:
receive the timer configuration parameters sent by an access network device through a Radio Resource Control (RRC) reconfiguration message; or
receive the timer configuration parameters sent by the second terminal through a sidelink RRC reconfiguration message.

18. The first terminal of claim 10, wherein the processor is further configured to perform at least one of:

monitoring a Physical Sidelink Control Channel (PSCCH) and a Physical Sidelink Shared Channel (PSSCH) when a reception DRX retransmission timer is running, to obtain a retransmission signal from the second terminal; or monitoring a Physical Sidelink Feedback Channel (PSFCH) when a transmission DRX retransmission timer is running, to obtain a feedback signal from the second terminal.

\* \* \* \* \*